(12) United States Patent
Hamman et al.

(10) Patent No.: US 12,703,489 B2
(45) Date of Patent: Aug. 11, 2026

(54) INTEGRATION OF AN ICE PROTECTION SYSTEM AND AN ICE DETECTOR INTO A SINGLE LINE REPLACEABLE UNIT

(71) Applicant: GOODRICH CORPORATION, Charlotte, NC (US)

(72) Inventors: Matthew Hamman, Fairview Park, OH (US); Galdemir Botura, Copley, OH (US); Rohan Chabukswar, Cork (IE); El Hassan Ridouane, County Cork (IE); Giancarlo Gelao, Cork (IE)

(73) Assignee: GOODRICH CORPORATION, Charlotte, NC (US)

( * ) Notice: Subject to any disclaimer, the term of this patent is extended or adjusted under 35 U.S.C. 154(b) by 123 days.

(21) Appl. No.: 18/444,655

(22) Filed: Feb. 17, 2024

(65) Prior Publication Data

US 2025/0263171 A1 Aug. 21, 2025

(51) Int. Cl.
*B64D 15/12* (2006.01)
*B64D 15/20* (2006.01)
*G01V 3/02* (2006.01)

(52) U.S. Cl.
CPC ............. *B64D 15/12* (2013.01); *B64D 15/20* (2013.01); *G01V 3/02* (2013.01)

(58) Field of Classification Search
CPC .......... G01V 3/02; B64D 15/00; B64D 15/12; B64D 15/14; B64D 15/20; B64D 15/22; B64D 2033/0233; H05B 2214/02; H05B 2214/04
See application file for complete search history.

(56) References Cited

U.S. PATENT DOCUMENTS 8,172,180 B2 5/2012 Press
8,517,601 B2 8/2013 Stothers et al.
10,232,949 B2 3/2019 English et al.
10,640,217 B2 5/2020 Botura et al.
10,822,097 B2 11/2020 Smith et al.
(Continued)

FOREIGN PATENT DOCUMENTS

CN 116750194 9/2023
CN 116750194 A * 9/2023 ............. B64D 15/12
(Continued)

OTHER PUBLICATIONS

European Patent Office, European Search Report dated Jul. 2, 2025 in Application No. 25158298.7.
(Continued)

*Primary Examiner* — Huy Q Phan
*Assistant Examiner* — David B Frederiksen
(74) *Attorney, Agent, or Firm* — SNELL & WILMER L.L.P.

(57) ABSTRACT

An integrated ice detector and ice protection system is provided. The integrated ice detector and ice protection system includes an electric resistance heater element layer, a sensing element, and at least one second electrically insulative layer positioned between the electric resistance heater element layer and the at least one first electrically insulative layer with the sensing element. The sensing element is disposed in at least one first electrically insulative layer and wherein the sensing element is positioned outward from the electric resistance heater element layer.

20 Claims, 5 Drawing Sheets

(56) References Cited

U.S. PATENT DOCUMENTS

| | | | | |
|---|---|---|---|---|
| 11,242,152 | B2 | 2/2022 | Opificius et al. | |
| 11,618,575 | B2 | 4/2023 | Botura et al. | |
| 2007/0210073 | A1 * | 9/2007 | Hubert | H05B 3/262 219/535 |
| 2014/0224782 | A1 * | 8/2014 | Nordman | B32B 15/18 219/202 |
| 2015/0183530 | A1 * | 7/2015 | Strobl | B64D 15/12 156/60 |
| 2015/0246730 | A1 * | 9/2015 | Khozikov | B64D 15/12 244/134 D |
| 2016/0159485 | A1 * | 6/2016 | Le Garrec | B64D 15/12 244/134 D |
| 2018/0215476 | A1 * | 8/2018 | Chee | C09D 7/65 |
| 2019/0152614 | A1 * | 5/2019 | Opificius | B64D 15/12 |
| 2021/0179276 | A1 * | 6/2021 | Hu | C09D 5/00 |
| 2021/0231592 | A1 | 7/2021 | Zadell et al. | |

FOREIGN PATENT DOCUMENTS

| | | |
|---|---|---|
| CN | 117979476 | 5/2024 |
| EP | 3854690 | 5/2023 |

OTHER PUBLICATIONS

European Patent Office, European Office Action dated May 12, 2026 in Application No. 25158298.7.

* cited by examiner 300
304
306
308
310
312
314
302
316
318

INTEGRATION OF AN ICE PROTECTION SYSTEM AND AN ICE DETECTOR INTO A SINGLE LINE REPLACEABLE UNIT

FIELD

The present disclosure generally relates to an ice protection system and more specifically to integration of an ice protection system and an ice detector into a single line replaceable unit.

BACKGROUND

Ice protection systems (IPS) allow aircraft pilots to exit icing conditions and avoid accidents due to rapid ice accumulation on leading surfaces of an aircraft. Various modes of IPS include pneumatic, electro-thermal, and electro-mechanical expulsion systems. Pneumatic deicing systems use engine bleed air to inflate rubber boots, generating shear stress to break and shed ice formed on leading edges. Electro-thermal deicing systems convert electrical energy to heat the leading-edge surfaces and shed ice by melting the ice at the ice-leading edge interface. Electro-mechanical deicing systems use electrical energy to actuate various elements/mechanisms on the leading-edge surface to impart shear stress to ice formation and shed the ice.

SUMMARY

An integrated ice detector and ice protection system is disclosed herein. The integrated ice detector and ice protection system includes an electric resistance heater element layer, a sensing element, and at least one second electrically insulative layer. The sensing element is disposed in at least one first electrically insulative layer and the sensing element is positioned outward from the electric resistance heater element layer. The at least one second electrically insulative layer is positioned between the electric resistance heater element layer and the at least one first electrically insulative layer with the sensing element.

In various embodiments, the electric resistance heater element layer includes at least one of a metallic or a carbon nanotube electric resistance heater element.

In various embodiments, the sensing element includes one or more sensors and a metallic or a carbon nanotube electric resistance heater element.

In various embodiments, the at least one first electrically insulative layer and the at least one second electrically insulative layer are at least one of a composite layer, a dielectric layer, or a combination thereof.

In various embodiments, the integrated ice detector and ice protection system further includes at least one third electrically insulative layer positioned outward from the at least one first electrically insulative layer and covering the sensing element and the at least one first electrically insulative layer. In various embodiments, the at least one third electrically insulative layer is at least one of a composite layer, a dielectric layer, or a combination thereof.

In various embodiments, the integrated ice detector and ice protection system further includes at least one first protective layer positioned outward from the at least one third electrically insulative layer. In various embodiments, the at least one first protective layer is at least one of a composite layer, a dielectric layer, a metallic layer, or a combination thereof.

In various embodiments, the integrated ice detector and ice protection system further includes at least one fourth electrically insulative layer positioned inward from the electric resistance heater element layer. In various embodiments, the at least one fourth electrically insulative layer is at least one of a composite layer, a dielectric layer, or a combination thereof.

In various embodiments, the integrated ice detector and ice protection system further includes at least one first protective layer positioned inward from the at least one fourth electrically insulative layer. In various embodiments, the at least one first protective layer is at least one of a composite layer, a dielectric layer, a metallic layer, or a combination thereof.

In various embodiments, the sensing element is disposed within a recess formed by the at least one first electrically insulative layer.

In various embodiments, the integrated ice detector and ice protection system is a line replaceable unit.

Also disclosed herein is an aircraft. The aircraft includes an aircraft structure and an integrated ice detector and ice protection system. The integrated ice detector and ice protection system includes an electric resistance heater element layer, a sensing element, and at least one second electrically insulative layer. The sensing element is disposed in at least one first electrically insulative layer and the sensing element is positioned outward from the electric resistance heater element layer. The at least one second electrically insulative layer is positioned between the electric resistance heater element layer and the at least one first electrically insulative layer with the sensing element.

In various embodiments, the electric resistance heater element layer includes at least one of a metallic or a carbon nanotube electric resistance heater element.

In various embodiments, the sensing element includes one or more sensors and a metallic or a carbon nanotube electric resistance heater element.

In various embodiments, the at least one first electrically insulative layer and the at least one second electrically insulative layer are at least one of a composite layer, a dielectric layer, or a combination thereof.

In various embodiments, the integrated ice detector and ice protection system further includes at least one third electrically insulative layer positioned outward from the at least one first electrically insulative layer and covering the sensing element and the at least one first electrically insulative layer. In various embodiments, the at least one third electrically insulative layer is at least one of a composite layer, a dielectric layer, or a combination thereof.

In various embodiments, the integrated ice detector and ice protection system further includes at least one first protective layer positioned outward from the at least one third electrically insulative layer. In various embodiments, the at least one first protective layer is at least one of a composite layer, a dielectric layer, a metallic layer, or a combination thereof.

In various embodiments, the integrated ice detector and ice protection system further includes at least one fourth electrically insulative layer positioned inward from the electric resistance heater element layer. In various embodiments, the at least one fourth electrically insulative layer is at least one of a composite layer, a dielectric layer, or a combination thereof.

In various embodiments, the integrated ice detector and ice protection system further includes at least one first protective layer positioned inward from the at least one fourth electrically insulative layer. In various embodiments, the at least one first protective layer is at least one of a composite layer, a dielectric layer, a metallic layer, or a combination thereof.

In various embodiments, the sensing element is disposed within a recess formed by the at least one first electrically insulative layer. In various embodiments, the integrated ice detector and ice protection system is a line replaceable unit.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
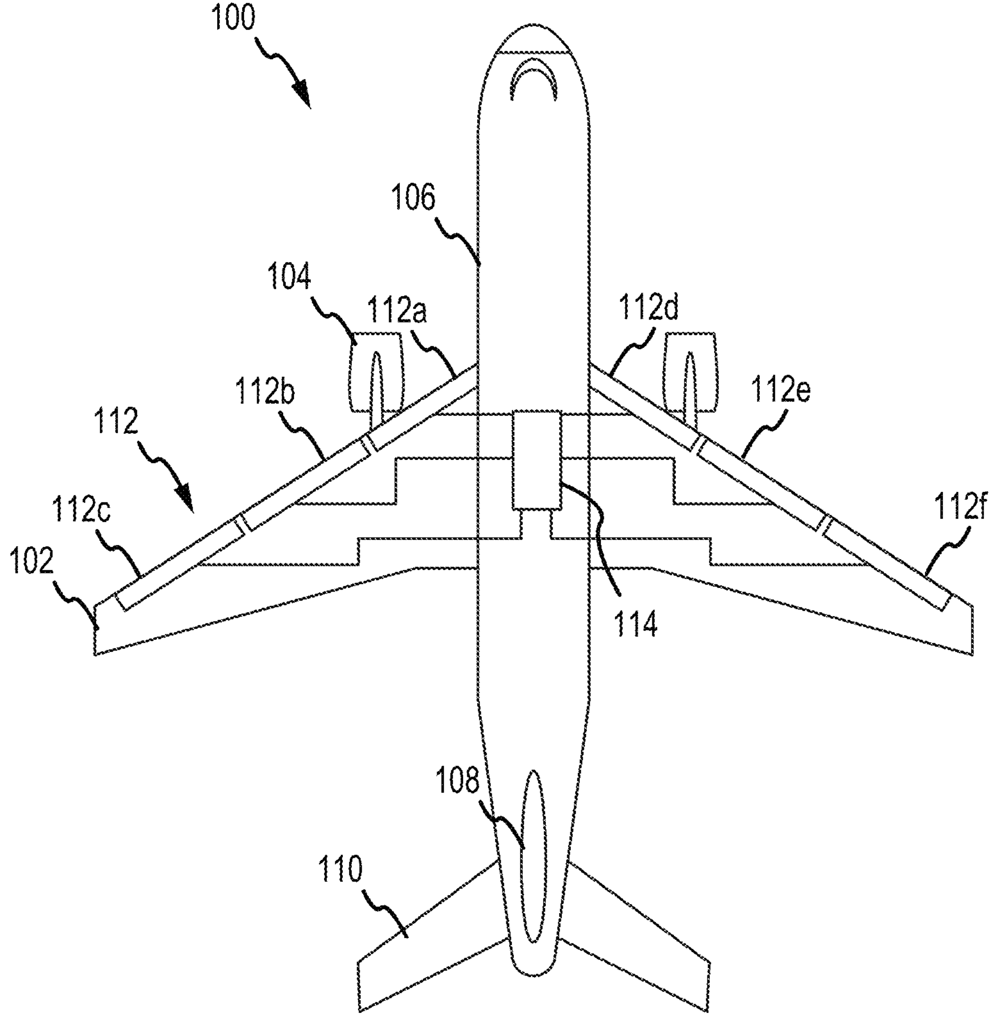
FIG. 1 illustrates an aircraft including a deicing assembly on the wings, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical, and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

An aircraft must be pushed through the air to generate lift. Aircraft wings may generate most of the lift associated with holding the aircraft in the air. Accordingly, aircraft wings may be shaped as an airfoil. An airfoil may be a cross-sectional shape of an object whose motion through a fluid is capable of generating lift. The air may resist aircraft motion in the form of aerodynamic drag. Turbine engines may provide thrust to overcome drag and push the aircraft forward. A wing's aerodynamic efficiency may be expressed as a lift-to-drag ratio. A high lift-to-drag ratio may be associated with a smaller thrust to propel the wings through the air at sufficient lift, and vice versa.

Ice formation on a leading edge of a wing, as well as other aircraft structures, such as vertical stabilizers or horizontal stabilizers, among others, may disrupt or destroy the smooth flow of air along the aircraft structures, increasing drag while decreasing the ability of the wing to create lift. Accordingly, ice formation on the leading edge of an aircraft structures may prevent an aircraft from taking off, or worse, may interfere with flight.

Disclosed herein is an integrated ice detector and ice protection system. In various embodiments, the integrated ice detector and ice protection system may be a line-replaceable unit (LRU). In various embodiments, the integrated ice detector and ice protection system includes an electric resistance heater element, which provides anti-ice/de-icing functionality, and a sensing element, which detects an icing event. In various embodiments, the electric resistance heater element and the sensing element may be encapsulated in composite material, a metallic material, or any combination thereof. In various embodiments, the electric resistance heater element includes a metallic or a carbon nanotube electric resistance heater element. In various embodiments, the sensing element may include one or more sensors and a metallic or a carbon nanotube electric resistance heater element that provides heat to maintain the operation of the sensing element. In that regard, in various embodiments, the sensing element provides its own anti-ice protection via the metallic or the carbon nanotube electric resistance heater element that is designed to keep the leading-edge of the sensing element free from ice in various conditions. In various embodiments, the provided functionality of the sensing element allows the sensing element to be integrated within a larger electrothermal de-ice/anti-ice heater mat because the sensing element is materially compatible and may provide its own ice protection in the immediate location where the sensing element is positioned. Therefore, by accounting for the metallic or the carbon nanotube electric resistance heater element of the sensing element integrated with the electric resistance heater element, in various embodiments, the sensing element may be layered into the composite material, the metallic material, any combination thereof, of the LRU without compromising overall ice protection performance.

Referring now to FIG. 1, a top view of an aircraft 100 is illustrated, in accordance with various embodiments. Aircraft 100 includes wings 102, engines 104, a fuselage 106, a vertical stabilizer 108, and horizontal stabilizers 110, among other control surfaces. Aircraft 100 further includes a plurality of deicing assemblies 112 including deicing assemblies 112*a*, 112*b*, 112*c* on a first wing 102 and deicing assemblies 112*d*, 112*e*, 112*f* on a second wing 102. In various embodiments, deicing assemblies 112 may be positioned on a leading edge of each wing 102 (as illustrated in FIG. 1) to prevent the buildup of ice on the leading edge of each wing 102. In various embodiments, deicing assemblies 112*a*, 112*d* may be positioned at a proximal end of wings 102 adjacent the fuselage 106, deicing assemblies 112*c*, 112*f* may be positioned at a distal end of wings 102, and deicing assemblies 112*b*, 112*e* may be positioned between deicing assemblies 112*a*, 112*d* and deicing assemblies 112*c*, 112*f*, respectively.

In various embodiments, deicing assemblies 112 may be positioned on an external surface of wings 102. In various embodiments, deicing assemblies 112 may be positioned on an internal surface of wings 102. In various embodiments, deicing assemblies 112 may be, additionally or in various embodiments, coupled to an external surface and/or an internal surface of a leading edge of engines 104, fuselage 106, vertical stabilizer 108, horizontal stabilizers 110, and/or other control surfaces of aircraft 100. For simplicity and ease of discussion, deicing assemblies 112 will be described as being coupled to the leading edge of wings 102, though other locations are considered.

In various embodiments, each of the deicing assemblies 112*a*-112*f* may be individually coupled to a controller 114. In various embodiments, controller 114 may include one or more processors configured to implement various logical operations in response to execution of instructions, for example, instructions stored on a non-transitory, tangible, computer-readable medium. The one or more processors can be a general-purpose processor, a microprocessor, a micro-controller, a digital signal processor (DSP), an application specific integrated circuit (ASIC), a field programmable gate array (FPGA) or other programmable logic device, discrete or transistor logic, discrete hardware components, or any combination thereof. In various embodiments, controller 114 may further include memory to store data, executable instructions, system program instructions, and/or controller instructions to implement the control logic of controller 114.

System program instructions and/or controller instructions may be loaded onto a non-transitory, tangible computer-readable medium having instructions stored thereon that, in response to execution by the controller 114, cause the controller 114 to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 2A:
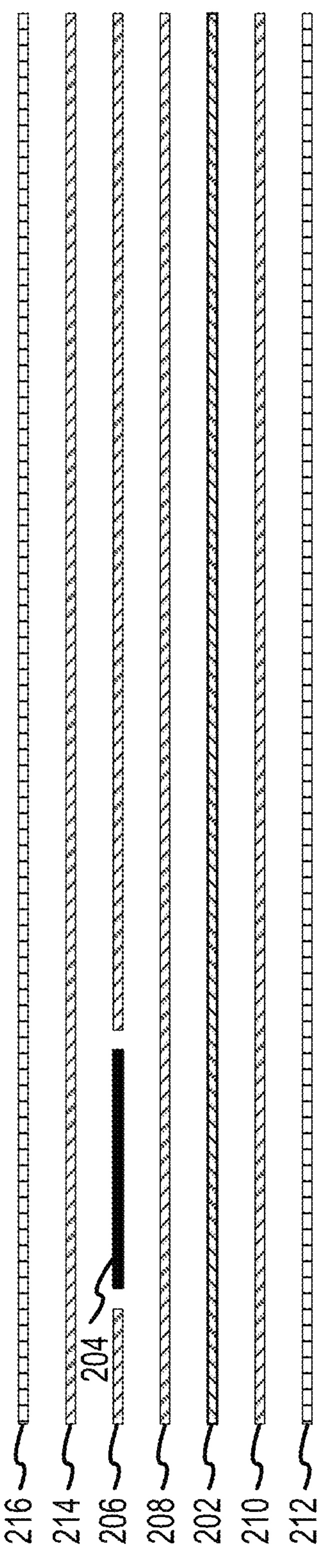
FIGS. 2A and 2B illustrate a cross sectional view and an isometric view, respectively, of an integrated ice detector and ice protection system, in accordance with various embodiments.
Figure 2B:
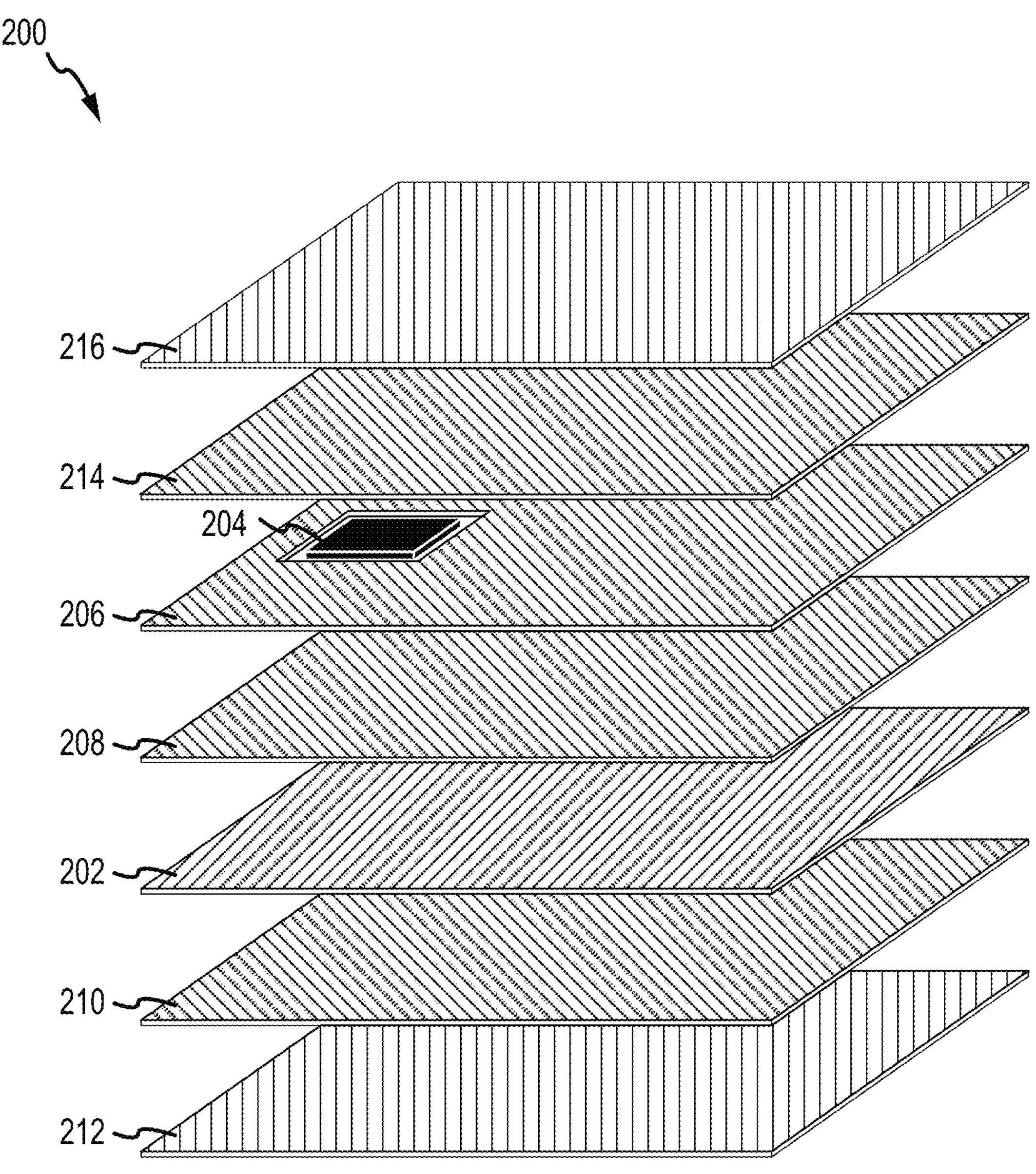

Referring to FIGS. 2A and 2B, in accordance with various embodiments, a cross sectional view and an isometric view, respectively, of an integrated ice detector and ice protection system, is illustrated. In various embodiments, the integrated ice detector and ice protection system 200 may be a line replaceable unit (LRU). In various embodiments, integrated ice detector and ice protection system 200 may be positioned on an external surface and/or an internal surface of a leading edge of wings 102, engines 104, fuselage 106, vertical stabilizer 108, horizontal stabilizers 110, and/or other control surfaces of aircraft 100 of FIG. 1. In various embodiments, the integrated ice detector and ice protection system 200 may be one of deicing assemblies 112*a*-112*f* of FIG. 1. In various embodiments, each of deicing assemblies 112*a*-112*f* may include one or more of integrated ice detector and ice protection system 200.

In various embodiments, the integrated ice detector and ice protection system 200 includes an electric resistance heater element layer 202 and a sensing element 204. In various embodiments, the electric resistance heater element layer 202 and the sensing element 204 may be coupled to a controller such as controller 114 of FIG. 1. In various embodiments, the electric resistance heater element layer 202 may include a metallic or a carbon nanotube electric resistance heater element. In various embodiments, the electric resistance heater element layer 202 is completely coextensive in a plane within the integrated ice detector and ice protection system 200 and is configured to perform anti-ice/de-icing functionality responsive to being activated by the controller. In various embodiments, the controller activates the electric resistance heater element layer 202 in response to a signal received from the sensing element 204.

In various embodiments, the sensing element 204 may include one or more sensors and a metallic or a carbon nanotube electric resistance heater element that provides heat to maintain the operation of the sensing element 204. In that regard, in various embodiments, the sensing element 204 provides its own anti-ice protection via the metallic or the carbon nanotube electric resistance heater element that is designed to keep the leading-edge of the sensing element free from ice in all conditions. In various embodiments, the provided functionality of the sensing element 204 allows the sensing element 204 to be integrated with the electric resistance heater element layer 202 because the sensing element 204 is materially compatible and may provide its own ice protection in the immediate location where the sensing element 204 is positioned. In that regard, in various embodiments, the sensing element 204 is embedded within an electrically insulative layer 206, which is positioned outward from the electric resistance heater element layer 202. In various embodiments, the electrically insulative layer 206 may be a composite layer, a dielectric layer, or a combination thereof that provides electrical insulation to the sensing element 204. In various embodiments, responsive to the electrically insulative layer 206 being a composite layer, the composite layer may include a thermoset composite materials that include, but are not limited to, epoxy resin film adhesive or epoxy pre-impregnated fiberglass, among others. In various embodiments, responsive to the electrically insulative layer 206 being a dielectric layer, the dielectric layer may include polyethylene terephthalate (PET), polyether nitrile (PEN), polyamide, or polydimethylsiloxane (PDMS), among others.

In various embodiments, electrically insulative layer 208 is positioned between the electric resistance heater element layer 202 and the electrically insulative layer 206 that includes the sensing element 204. Electrically insulative layer 208 is similar to electrically insulative layer 206 in that electrically insulative layer 208 may be a composite layer, a dielectric layer, or a combination thereof, and provides electrical insulation between the electric resistance heater element layer 202 and the electrically insulative layer 206 that includes the sensing element 204. In various embodiments, electrically insulative layer 208 may be multiple layers. In various embodiments, responsive to electrically insulative layer 208 being two layers, then each layer may be a composite layer, a dielectric layer, or a combination thereof. In various embodiments, responsive to electrically insulative layer 208 being three or more layers, then the layers immediately adjacent to the electric resistance heater element layer 202 and the electrically insulative layer 206 that includes the sensing element 204 may be a composite layer, a dielectric layer, or a combination thereof, and the layers between the composite layer or the dielectric layer may be a composite layer, a dielectric layer, a metallic layer, or a combination thereof.

In various embodiments, positioned inward from the electric resistance heater element layer 202 is electrically insulative layer 210. Electrically insulative layer 210 is similar to electrically insulative layer 206 in that electrically insulative layer 210 may be a composite layer, a dielectric layer, or a combination thereof, and provides electrical insulation to the electric resistance heater element layer 202. In various embodiments, protective layer 212 may be positioned inward from electrically insulative layer 210. In various embodiments, protective layer 212 may be a composite layer, a dielectric layer, a metallic layer, or a combination thereof. In various embodiments, positioned outward from the electrically insulative layer 206 that includes the sensing element 204 is electrically insulative layer 214. Electrically insulative layer 214 is similar to electrically insulative layer 206 in that electrically insulative layer 214 may be a composite layer, a dielectric layer, or a combination thereof, and provides electrical insulation to the electrically insulative layer 206 that includes the sensing element 204. In various embodiments, protective layer 216 may be positioned outward from electrically insulative layer 214. In various embodiments, protective layer 216 may be a composite layer, a dielectric layer, a metallic layer, or a combination thereof.

In various embodiments, an individual thickness of each of the electric resistance heater element layer 202, the electrically insulative layer 206 that includes the sensing element 204, and each of layers 208, 210, and 214 may be between 0.002 inches (0.00508 centimeter) and 0.020 inches (0.0508 centimeter). In various embodiments, an individual thickness of each of the electric resistance heater element layer 202, the electrically insulative layer 206 that includes the sensing element 204, and each of layers 208, 210, and 214 may be between 0.0025 inches (0.00635 centimeter) and 0.015 inches (0.0381 centimeter). In various embodiments, an individual thickness of each of the electric resistance heater element layer 202, the electrically insulative layer 206 that includes the sensing element 204, and each of layers 208, 210, and 214 may be between 0.003 inches (0.00762 centimeter) and 0.010 inches (0.0254 centimeter). In various embodiments, an individual thickness of each of the protective layers 212 and 216, responsive to being all composite, may be between 0.002 inches (0.00508 centimeter) and 0.020 inches (0.0508 centimeter). In various embodiments, an individual thickness of each of the protective layers 212 and 216, responsive to being all composite, may be between 0.0025 inches (0.00635 centimeter) and 0.015 inches (0.0381 centimeter). In various embodiments, an individual thickness of each of the protective layers 212 and 216, responsive to being all composite, may be between 0.003 inches (0.00762 centimeter) and 0.010 inches (0.0254 centimeter). In various embodiments, an individual thickness of each of the protective layers 212 and 216, responsive to being all metallic or responsive to including a dielectric layer and/or a metallic layer, may be between 0.025 inches (0.0635 centimeter) and 0.25 inches (0.635 centimeter). In various embodiments, an individual thickness of each of the protective layers 212 and 216, responsive to being all metallic or responsive to including a dielectric layer and/or a metallic layer, may be between 0.05 inches (0.127 centimeter) and 0.020 inches (0.0508 centimeter). In various embodiments, an individual thickness of each of the protective layers 212 and 216, responsive to being all metallic or responsive to including a dielectric layer and/or a metallic layer, may be between 0.075 inches (0.1905 centimeter) and 0.125 inches (0.3175 centimeter).

Figure 3A:
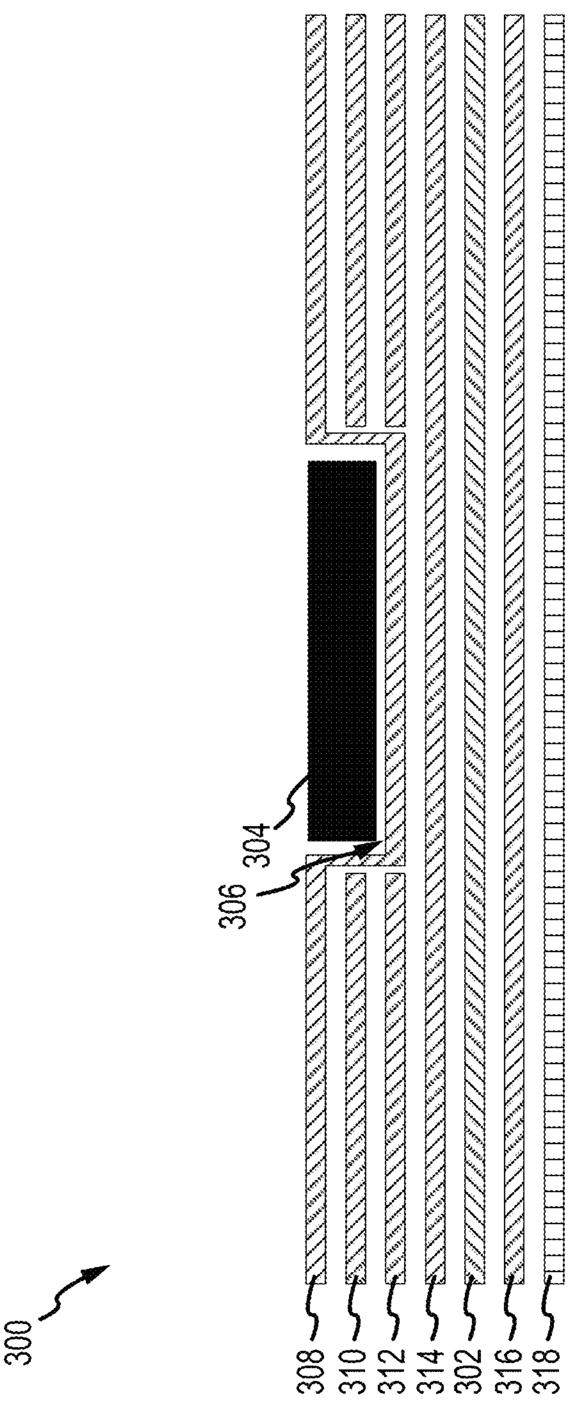
FIGS. 3A and 3B illustrate a cross sectional view and an isometric view, respectively, of an integrated ice detector and ice protection system, in accordance with various embodiments.
Figure 3A:
Figure 3B:
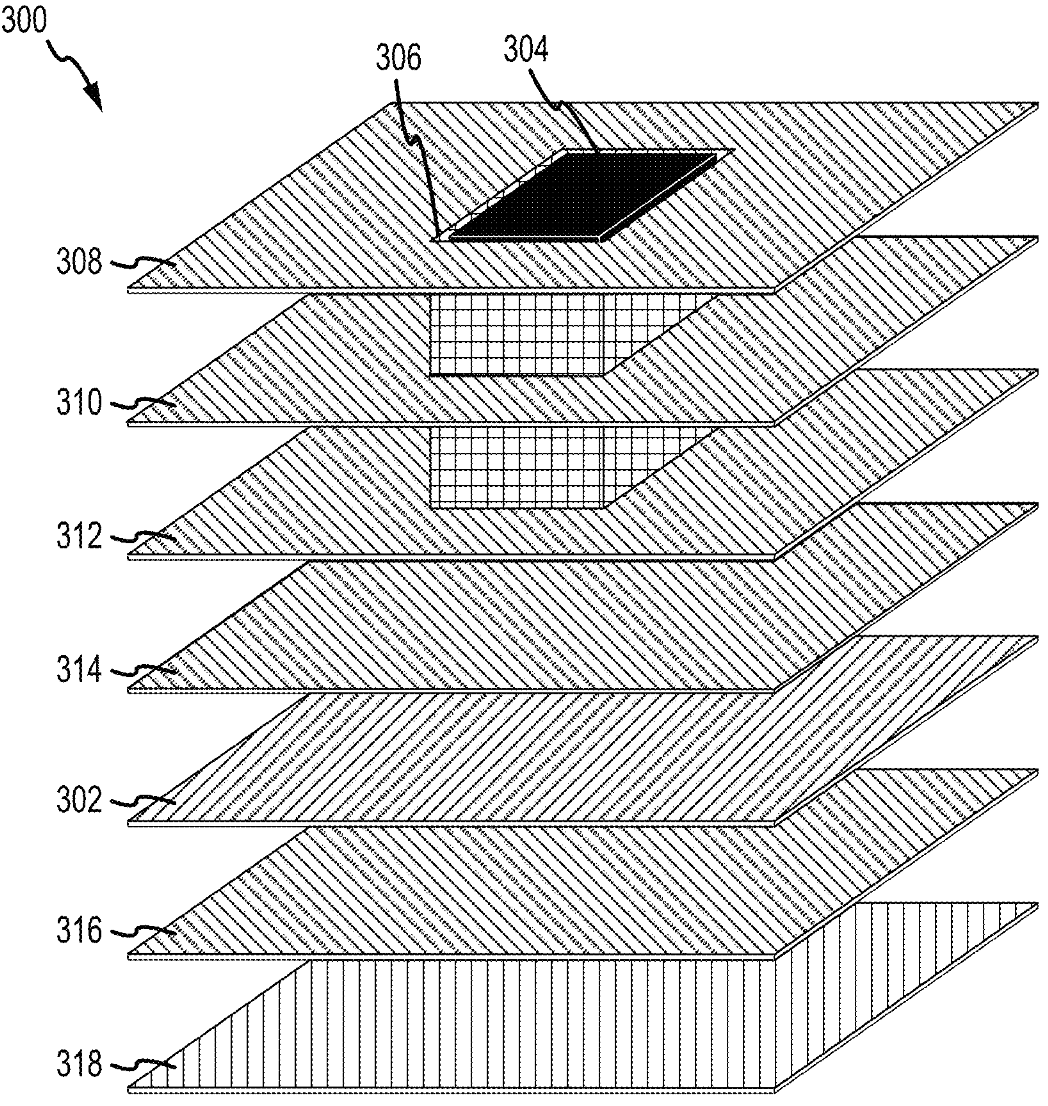

Referring to FIGS. 3A and 3B, in accordance with various embodiments, a cross sectional view and an isometric view, respectively, of an integrated ice detector and ice protection system, is illustrated. In various embodiments, the integrated ice detector and ice protection system 300 may be a line-replaceable unit (LRU). In various embodiments, the integrated ice detector and ice protection system 300 may be positioned on an external surface of a leading edge of wings 102, engines 104, fuselage 106, vertical stabilizer 108, horizontal stabilizers 110, and/or other control surfaces of aircraft 100 of FIG. 1. In various embodiments, the integrated ice detector and ice protection system 300 may be one of deicing assemblies 112_a_-112_f_ of FIG. 1. In various embodiments, each of deicing assemblies 112_a_-112_f_ may include one or more of integrated ice detector and ice protection system 300.

In various embodiments, the integrated ice detector and ice protection system 300 includes an electric resistance heater element layer 302 and a sensing element 304. In various embodiments, the electric resistance heater element layer 302 and the sensing element 304 may be coupled to a controller such as controller 114 of FIG. 1. In various embodiments, the electric resistance heater element layer 302 may include a metallic or a carbon nanotube electric resistance heater element. In various embodiments, the electric resistance heater element layer 302 is an entire layer within the integrated ice detector and ice protection system 300 and is configured to perform anti-ice/de-icing functionality responsive to being activated by the controller. In various embodiments, the controller activates the electric resistance heater element layer 302 in response to a signal received from the sensing element 304.

In various embodiments, the sensing element 304 may include one or more sensors and a metallic or a carbon nanotube electric resistance heater element that provides heat to maintain the operation of the sensing element 304. In that regard, in various embodiments, the sensing element 304 provides its own anti-ice protection via the metallic or the carbon nanotube electric resistance heater element that is designed to keep the leading-edge of the sensing element free from ice in all conditions. In various embodiments, the provided functionality of the sensing element 304 allows the sensing element 304 to be integrated with the electric resistance heater element layer 302 because the sensing element 304 is materially compatible and may provide its own ice protection in the immediate location where the sensing element 304 is positioned. In that regard, in various embodiments, the sensing element 304 is embedded within a recess 306 formed in electrically insulative layer 308 and protruding inward through electrically insulative layers 310 and 312, which are positioned outward from the electric resistance heater element layer 302. In various embodiments, electrically insulative layers 308, 310, and 312 may be composite layers, dielectric layers, or combinations thereof, that provide electrical insulation to the sensing element 304. In various embodiments, responsive to the electrically insulative layers 308, 310, and 312 being composite layers, the composite layers may include a thermoset composite materials that include, but are not limited to, epoxy resin film adhesive or epoxy pre-impregnated fiberglass, among others. In various embodiments, responsive to the electrically insulative layers 308, 310, and 312 being dielectric layers, the dielectric layers may include polyethylene terephthalate (PET), polyether nitrile (PEN), polyamide, or polydimethylsiloxane (PDMS), among others.

In various embodiments, electrically insulative layer 314 is positioned between the electric resistance heater element layer 302 and the electrically insulative layers 308, 310, and 312 that includes the sensing element 304. Electrically insulative layer 314 is similar to electrically insulative layers 308, 310, and 312 in that electrically insulative layer 314 may be a composite layer, a dielectric layer, or a combination thereof, and provides electrical insulation between the electric resistance heater element layer 302 and the electrically insulative layers 308, 310, and 312 that includes the sensing element 304. In various embodiments, electrically insulative layer 314 may be multiple layers. In various embodiments, responsive to electrically insulative layer 314 being two layers, then each layer may be a composite layer, a dielectric layer, or a combination thereof. In various embodiments, responsive to electrically insulative layer 314 being three or more layers, then the layers immediately adjacent to the electric resistance heater element layer 302 and the electrically insulative layers 308, 310, and 312 that includes the sensing element 304 may be a composite layer, a dielectric layer, or a combination thereof. and the layers between the composite layer or the dielectric layer may be a composite layer, a dielectric layer, a metallic layer, or a combination thereof.

In various embodiments, positioned inward from the electric resistance heater element layer 302 is electrically insulative layer 316. Electrically insulative layer 316 is similar to electrically insulative layers 308, 310, and 312 in that electrically insulative layer 316 may be a composite layer, a dielectric layer, or a combination thereof, and provides electrical insulation to the electric resistance heater element layer 302. In various embodiments, protective layer 318 may be positioned inward from electrically insulative layer 316. In various embodiments, protective layer 318 may be a composite layer, a dielectric layer, a metallic layer, or a combination thereof. In various embodiments, an individual thickness of each of the electric resistance heater element layer 302, the electrically insulative layers 308, 310, and 312, and each of layers 314 and 316 may be between 0.002 inches (0.00508 centimeter) and 0.020 inches (0.0508 centimeter). In various embodiments, an individual thickness of the electric resistance heater element layer 302, the electrically insulative layers 308, 310, and 312, and each of layers 314 and 316 may be between 0.0025 inches (0.00635 centimeter) and 0.015 inches (0.0381 centimeter). In various embodiments, an individual thickness of the electric resistance heater element layer 302, the electrically insulative layers 308, 310, and 312, and each of layers 314 and 316 may be between 0.003 inches (0.00762 centimeter) and 0.010 inches (0.0254 centimeter).

In various embodiments, a thickness of the sensing element 304 may be between 0.020 inches and 0.045 inches due to the sensing element 304 including a combination of composite material, a heater element, sensors, and a protective layer. In various embodiments, a thickness of the sensing element 304, may be between 0.023 inches and 0.042 inches due to the sensing element 304 including a combination of composite material, a heater element, sensors, and a protective layer. In various embodiments, a thickness of the sensing element 304 may be between 0.025 inches and 0.040 inches due to the sensing element 304 including a combination of composite material, a heater element, sensors, and a protective layer.

In various embodiments, a thickness of the protective layer 318, responsive to being all composite, may be between 0.002 inches (0.00508 centimeter) and 0.020 inches (0.0508 centimeter). In various embodiments, a thickness of the protective layer 318, responsive to being all composite, may be between 0.0025 inches (0.00635 centimeter) and 0.015 inches (0.0381 centimeter). In various embodiments, a thickness of the protective layer 318, responsive to being all composite, may be between 0.003 inches (0.00762 centimeter) and 0.010 inches (0.0254 centimeter). In various embodiments, a thickness of the protective layer 318, responsive to being all metallic or responsive to including a dielectric layer and/or a metallic layer, may be between. 0.025 inches (0.0635 centimeter) and 0.25 inches (0.635 centimeter). In various embodiments, a thickness of the protective layer 318, responsive to being all metallic or responsive to including a dielectric layer and/or a metallic layer, may be between 0.05 inches (0.127 centimeter) and 0.020 inches (0.0508 centimeter). In various embodiments, a thickness of the protective layer 318, responsive to being all metallic or responsive to including a dielectric layer and/or a metallic layer, may be between 0.075 inches (0.1905 centimeter) and 0.125 inches (0.3175 centimeter).

Accordingly, in various embodiments, the line replaceable unit (LRU) provides ice detection and prevention in a single LRU. In various embodiments, the LRU is of a similar thickness of typical deicing mechanisms, such that LRU does not protrude from the aircraft and cause aerodynamic disruptions. In various embodiments, the combined system within the LRU places the sensing element at a location where ice is encountered thereby making deicing more efficient. Additionally, in various embodiments, the LRU with combined ice detection and prevention may be significantly cheaper than other ice detectors. In various embodiments, when the sensor is positioned outward in the LRU, replacing the sensor may be performed without requiring the aerodynamic surface to be replaced entirely.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An integrated ice detector and ice protection system, comprising:
- an electric resistance heater element layer;
- at least one first electrically insulative layer, wherein the at least one first electrically insulative layer is positioned outward from the electric resistance heater element layer;
- a sensing element, wherein the sensing element is embedded within at least one first electrically insulative layer;
- at least one second electrically insulative layer positioned between the electric resistance heater element layer and the at least one first electrically insulative layer with the sensing element, thereby providing electrical insulation between the electric resistance heater element layer and the sensing element; and
- at least one first protective layer positioned outward from the at least one first electrically insulative layer with the sensing element such that the at least one first electrically insulative layer with the sensing element is between the at least one first protective layer and the at least one second electrically insulative layer.

2. The integrated ice detector and ice protection system of claim 1, wherein the electric resistance heater element layer comprises at least one of a metallic or a carbon nanotube electric resistance heater element.

3. The integrated ice detector and ice protection system of claim 1, wherein the sensing element comprises:
- one or more sensors; and
- a metallic or a carbon nanotube electric resistance heater element.

4. The integrated ice detector and ice protection system of claim 1, wherein the at least one first electrically insulative layer and the at least one second electrically insulative layer are at least one of a composite layer, a dielectric layer, or a combination thereof.

5. The integrated ice detector and ice protection system of claim 1, further comprising:
- at least one third electrically insulative layer positioned between the at least one first electrically insulative layer and the at least one first protective layer, wherein the at least one third electrically insulative layer is at least one of a composite layer, a dielectric layer, or a combination thereof.

6. The integrated ice detector and ice protection system of claim 5, wherein the at least one first protective layer is positioned outward from the at least one third electrically insulative layer, wherein the at least one first protective layer is at least one of a composite layer, a dielectric layer, a metallic layer, or a combination thereof.

7. The integrated ice detector and ice protection system of claim 5, further comprising:
- at least one fourth electrically insulative layer positioned inward from the electric resistance heater element layer, wherein the at least one fourth electrically insulative layer is at least one of a composite layer, a dielectric layer, or a combination thereof.

8. The integrated ice detector and ice protection system of claim 7, further comprising:
- at least one second protective layer positioned inward from the at least one fourth electrically insulative layer, wherein the at least one second protective layer is at least one of a composite layer, a dielectric layer, a metallic layer, or a combination thereof.

9. The integrated ice detector and ice protection system of claim 1, wherein the sensing element is embedded within a recess formed by the at least one first electrically insulative layer.

10. The integrated ice detector and ice protection system of claim 1, wherein the integrated ice detector and ice protection system is a line replaceable unit.

11. An aircraft, comprising:
- an aircraft structure; and
- an integrated ice detector and ice protection system, wherein the integrated ice detector and ice protection system comprises:
  - an electric resistance heater element layer;
  - at least one first electrically insulative layer, wherein the at least one first electrically insulative layer is positioned outward from the electric resistance heater element layer;

a sensing element, wherein the sensing element is embedded within at least one first electrically insulative layer;

at least one second electrically insulative layer positioned between the electric resistance heater element layer and the at least one first electrically insulative layer with the sensing element, thereby providing electrical insulation between the electric resistance heater element layer and the sensing element; and at least one first protective layer positioned outward from the at least one first electrically insulative layer with the sensing element such that the at least one first electrically insulative layer with the sensing element is between the at least one first protective layer and the at least one second electrically insulative layer.

12. The aircraft of claim 11, wherein the electric resistance heater element layer comprises at least one of a metallic or a carbon nanotube electric resistance heater element.

13. The aircraft of claim 11, wherein the sensing element comprises:

one or more sensors; and a metallic or a carbon nanotube electric resistance heater element.

14. The aircraft of claim 11, wherein the at least one first electrically insulative layer and the at least one second electrically insulative layer are at least one of a composite layer, a dielectric layer, or a combination thereof.

15. The aircraft of claim 11, wherein the integrated ice detector and ice protection system further comprises:

at least one third electrically insulative layer positioned between the at least one first electrically insulative layer and the at least one first protective layer, wherein the at least one third electrically insulative layer is at least one of a composite layer, a dielectric layer, or a combination thereof.

16. The aircraft of claim 15, wherein the integrated ice detector and ice protection system wherein the at least one first protective layer is positioned outward from the at least one third electrically insulative layer, wherein the at least one first protective layer is at least one of a composite layer, a dielectric layer, a metallic layer, or a combination thereof.

17. The aircraft of claim 15, wherein the integrated ice detector and ice protection system further comprises:

at least one fourth electrically insulative layer positioned inward from the electric resistance heater element layer, wherein the at least one fourth electrically insulative layer is at least one of a composite layer, a dielectric layer, or a combination thereof.

18. The aircraft of claim 17, wherein the integrated ice detector and ice protection system further comprises:

at least one second protective layer positioned inward from the at least one fourth electrically insulative layer, wherein the at least one second protective layer is at least one of a composite layer, a dielectric layer, a metallic layer, or a combination thereof.

19. The aircraft of claim 11, wherein the sensing element is embedded within a recess formed by the at least one first electrically insulative layer.

20. The aircraft of claim 11, wherein the integrated ice detector and ice protection system is a line replaceable unit.

* * * * *